No. 728,380. PATENTED MAY 19, 1903.
L. W. EGGLESTON.
GLASS SEAT FOR BALL VALVES.
APPLICATION FILED NOV. 1, 1902.
NO MODEL.

WITNESSES
Wm. F. Doyle.
A. L. Hough.

INVENTOR
Lewis W. Eggleston,
BY Franklin H. Hough
Attorney

No. 728,380. Patented May 19, 1903.

UNITED STATES PATENT OFFICE.

LEWIS W. EGGLESTON, OF APPLETON, WISCONSIN.

GLASS SEAT FOR BALL-VALVES.

SPECIFICATION forming part of Letters Patent No. 728,380, dated May 19, 1903.

Application filed November 1, 1902. Serial No. 129,772. (No model.)

*To all whom it may concern:*

Be it known that I, LEWIS W. EGGLESTON, a citizen of the United States, residing at Appleton, in the county of Outagamie and State of Wisconsin, have invented certain new and useful Improvements in Glass Seats for Ball-Valves; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in valve attachments, and particularly in the provision of a glass seat for a ball-cock; and it consists in the provision of a metallic tubing which is chambered out and adapted to receive a glass tubing, the end of which tapers slightly to fit securely against a shoulder formed in the metallic tubing, the upper end of the glass tubing adapted to form a seat for a float-actuated valve.

The invention consists, further, in various details of construction and combinations of parts, which will be hereinafter fully described and then specifically defined in the appended claim.

My invention is illustrated in the accompanying drawings, which, with the letters of reference marked thereon, form a part of this application, and in which drawings similar letters of reference indicate like parts in the views, in which—

Figure 1:
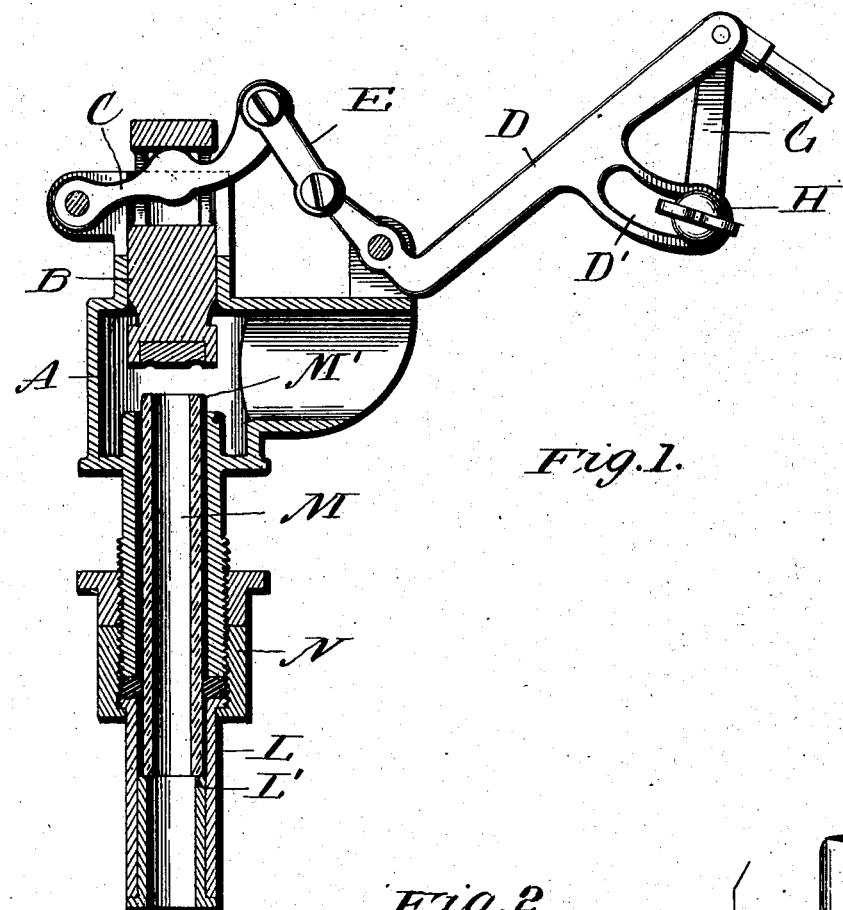
Figure 2:
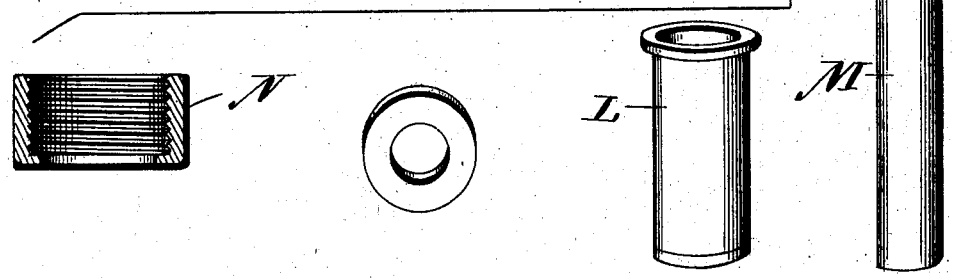

Figure 1 is a central vertical section through my invention, showing the glass valve-seat. Fig. 2 is a view showing parts of the device disassembled and illustrating the shape of the glass tube.

Reference now being had to the details of the drawings by letter, A designates the valve-chamber, having a valve B, the stem of which is apertured near its upper end to receive a lever C, pivoted at one end to bracket-arms on the wall of the valve-chamber, and D designates a lever which is connected to the lever C by means of a link E. The outer end of the lever D is adapted to be connected to a float-stem, and by means of the angled arm G the latter may be held in different positions by means of the adjusting-screw H, which works in an elongated slot D' in lever D. The original brass seat L has inserted in its lower end a flanged tubing L', on the upper end of which the glass tubing M rests, which latter has its upper end M' tapered. A gasket is placed about the glass tubing inside the tightening-nut N, and when the glass tube has been inserted in place it is passed up through the tubular portion of the valve-chamber, and the tightening-nut N, which is interiorly threaded, is screwed over the threaded portion of the circumference of the valve-chamber, and the parts are securely held together. The upper end of the glass tube forming the valve-seat is positioned in a location to receive the valve, as shown.

By the provision of a glass valve-seat made in accordance with my invention it will be observed that the same may be easily removed by simply detaching the parts and may be replaced by another when desired.

While I have shown a particular construction of device embodying my invention, it will be observed that I may make alterations in the construction of the same without departing from the spirit of the invention.

Having thus fully described my invention, what I claim as new, and desire to secure by Letters Patent, is—

In combination with a valve-chamber having an integral tubular extension, exteriorly threaded at one end, and its other end projecting into said chamber, a valve mounted in a contracted portion of said chamber and provided with a valve-block seated in a recess in the lower end of said valve, a flanged thimble, an interiorly-threaded union having a shoulder formed at the inner end of the threaded portion on which shoulder the flange of said thimble is adapted to rest, a packing intermediate the flanged end of the thimble and the threaded end of the extension of the valve-chamber, a thimble L' telescoping within the thimble L and having a flange fitting against the end of the thimble L and flush with the circumference thereof, and an open-ended glass tubing N resting on the inner end of the thimble L', the upper end of said glass tubing adapted to form a seat for said valve-block, as shown and described.

In testimony whereof I hereunto affix my signature in presence of two witnesses.

LEWIS W. EGGLESTON.

Witnesses:
W. M. BOWE,
R. ALLEN.